(12) United States Patent
Chen et al.

(10) Patent No.: US 11,044,169 B2
(45) Date of Patent: Jun. 22, 2021

(54) MAPPING 2-DIMENSIONAL MESHES ON 3-DIMENSIONAL TORUS

(71) Applicant: International Business Machines Corporation, Armonk, NY (US)

(72) Inventors: Dong Chen, Scarsdale, NY (US); Sameer Kumar, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 16/241,128

(22) Filed: Jan. 7, 2019

(65) Prior Publication Data

US 2020/0220787 A1 Jul. 9, 2020

(51) Int. Cl.
*H04L 12/24* (2006.01)
*H04L 29/08* (2006.01)

(52) U.S. Cl.
CPC .......... *H04L 41/145* (2013.01); *H04L 41/12* (2013.01); *H04L 67/10* (2013.01)

(58) Field of Classification Search
CPC . G06F 15/17387; H04L 41/12; H04L 41/145; H04L 67/10
USPC .......................................................... 370/254
See application file for complete search history.

(56) References Cited

U.S. PATENT DOCUMENTS

| | | | |
|---|---|---|---|
| 7,975,250 | B2 | 7/2011 | Honary et al. |
| 8,531,456 | B2 | 9/2013 | Fischer et al. |
| 9,117,034 | B2 | 8/2015 | Ikeda |
| 9,569,579 | B1 | 2/2017 | Kumar |
| 2005/0002387 | A1* | 1/2005 | Blumrich ................ H04L 45/06 370/386 |
| 2008/0084827 | A1* | 4/2008 | Archer .................... H04L 45/48 370/238 |
| 2009/0006808 | A1* | 1/2009 | Blumrich .......... G06F 15/17337 712/12 |
| 2012/0321309 | A1* | 12/2012 | Barry ....................... H04L 5/14 398/51 |

(Continued)

FOREIGN PATENT DOCUMENTS

CN 107612746 A 1/2018

OTHER PUBLICATIONS

Bhatele, A., et al., "Mapping Applications with Collectives over Sub-communicators on Torus Networks", SC12, Nov. 10-16, 2012, 11 pages.

(Continued)

*Primary Examiner* — Faruk Hamza
*Assistant Examiner* — Jean F Voltaire
(74) *Attorney, Agent, or Firm* — Scully, Scott, Murphy & Presser, P.C.; Daniel P. Ph Morris. D

(57) ABSTRACT

In a L×M×N 3D torus network of computer nodes, a 2-dimensional plane comprising M×N torus network of nodes mapped into M/2 meshes×2*N torus network of nodes. N can be k*M, k is an integer greater than zero, and M and N are even numbers. Each of M/2 mesh of the 2*N torus is contiguous in the 2D plane. Mapping is performed for each of the L planes of the L×M×N 3D torus network. The M/2 meshes are combined with a remaining torus network dimension comprising L planes, the combining creating another 2*N pattern, wherein an L*M/2×2*N communication pattern is created. Application entities are executed according to the mapped L*M/2×2*N communication pattern.

18 Claims, 6 Drawing Sheets

(56) References Cited

U.S. PATENT DOCUMENTS

| | | | | |
|---|---|---|---|---|
| 2014/0098702 A1* | 4/2014 | Fricker | ................... | H04L 12/28 |
| | | | | 370/254 |
| 2015/0049768 A1* | 2/2015 | Konda | .................. | H04L 49/102 |
| | | | | 370/411 |
| 2015/0222523 A1* | 8/2015 | O'Shea | ................... | H04L 69/40 |
| | | | | 709/226 |
| 2018/0167307 A1* | 6/2018 | Barry | ..................... | H04L 45/50 |

OTHER PUBLICATIONS

Bhatele, A., et al., "Automated Mapping of Regular Communication Graphs on Mesh Interconnects", HiPC 2010, Dec. 20, 2010, 68 pages.

* cited by examiner

MAPPING 2-DIMENSIONAL MESHES ON 3-DIMENSIONAL TORUS

STATEMENT REGARDING FEDERALLY SPONSORED RESEARCH OR DEVELOPMENT

This invention was made with Government support under Contract No.: B554331 awarded by Department of Energy. The Government has certain rights in this invention.

BACKGROUND

The present disclosure relates generally to interconnected nodes of a multiprocessor/multi-node High Performance Computing (HPC) system, and more particularly to mapping communication patterns on torus networks.

Computer systems such as super computer systems or high performance computing systems include thousands of nodes, which are interconnected according to a topology structure. In some instances, an interconnection network topology for computer communication patterns selected for a network of nodes can provide a difference in such computer systems' performance and scalability, for example, computational efficiency and communications. A 2-dimensional (2D) torus and 3-dimensional (3D) torus are examples of an interconnection network topology.

BRIEF SUMMARY

A system, in one aspect, may include an L×M×N 3-dimensional (3D) torus network of computer nodes. A 2-dimensional (2D) plane comprising M×N nodes of the 3D torus network may be mapped into M/2 meshes×2*N torus network of nodes, wherein N=k*M, k is an integer greater than zero, and M and N are even numbers, wherein each of M/2 mesh of the 2*N torus is contiguous in the 2D plane. Mapping may be performed for each of the M planes of the L×M×N 3D torus network. The M/2 meshes may be combined with a remaining torus network dimension comprising M planes. Combining may create an L*M/2 pattern, wherein an L*M/2×2*N communication pattern may be created and mapped to the L×M×N 3D torus network. Application entities can be executed according to the mapped L*M/2× 2*N communication pattern.

A computer-implemented method of mapping and executing a 2-dimensional (2D) communication pattern on a 3-dimensional (3D) network of computer nodes may be provided. The method, in one aspect, may include, in an L×M×N 3D torus network of computer nodes, mapping a 2D plane comprising M×N torus network of nodes into M/2 meshes×2*N torus network of nodes, wherein N=k*M, k is an integer greater than zero, and M and N are even numbers. In one aspect, each of M/2 mesh of the 2*N torus is contiguous in the 2D plane. In one aspect, the mapping is performed for each of the L planes of the L×M×N 3D torus network. The method may also include combining the M/2 meshes with a remaining torus network dimension comprising L planes, the combining creating another 2*N pattern, wherein an L*M/2×2*N communication pattern is created. The method may also include executing application entities according to the mapped L*M/2×2*N communication pattern.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Scientific applications may execute computational algorithms on a 2D or 3D grid of points. For instance, on a parallel machine (such as a high performance computing system) each processor gets a 2D or 3D sub-grid, and local computation is performed locally on the local grid, which is followed by a boundary exchange with neighboring processors. The boundary exchange results in a 2D or 3D communication pattern.

On a torus network, message communication performance is optimized when communication is exchanged with near neighbors. A hop-bytes metric may be used to localize message transfers over a few hops on the torus network, where the size of each message is multiplied by the number of hops a message travels on the network. This metric is summed over all messages transferred and minimized via a mapping algorithm. The mapping optimizes communications on N-dimensional torus networks.

Folding is a technique to map a lower dimensional k-dimensional (k-D) communication pattern to a higher dimensional N-dimensional (N-D) torus network. The dimensions of the N-D torus are chosen such that their products match a dimension of the k-D communication pattern. For example, if the communication pattern i0×i1× i2 . . . ik is to be mapped to n0×n1× . . . nN, a folding technique looks for i0=na0×na1 . . . naj, i1=nb0×nb1× . . . nbj. The fold produces smaller dimensional torus where each dimension is longer. However, this folding may not work in cases where dimensions are not foldable.

For instance, on 3D torus networks, a "good" mapping of application ranks (e.g., application processes or like entities identified by identifiers) to nodes on the torus can improve application performance. Briefly, each processing entity, for instance, of a parallel application, has an identification number referred to as a rank, which can be used in communications or data exchange with another processing entity. A parallel application can have a communication pattern. For instance, a communication pattern among software processing entities (e.g., processes, threads, or the like) of a parallel application (also referred to as an application virtual topology) can be mapped to target hardware architecture, for example, 3D torus network of physical computer nodes. Applications that have the 2D stencil communication pattern can be mapped to the 3D torus via known algorithms such as folding, where the two out of three dimensions of the 3D torus form one dimension of the 2D stencil and the third torus dimension forms the 2nd dimension of the 2D stencil. In stencil communication pattern or stencil pattern, for instance, a node communicates with its neighbor node.

Figure 5:
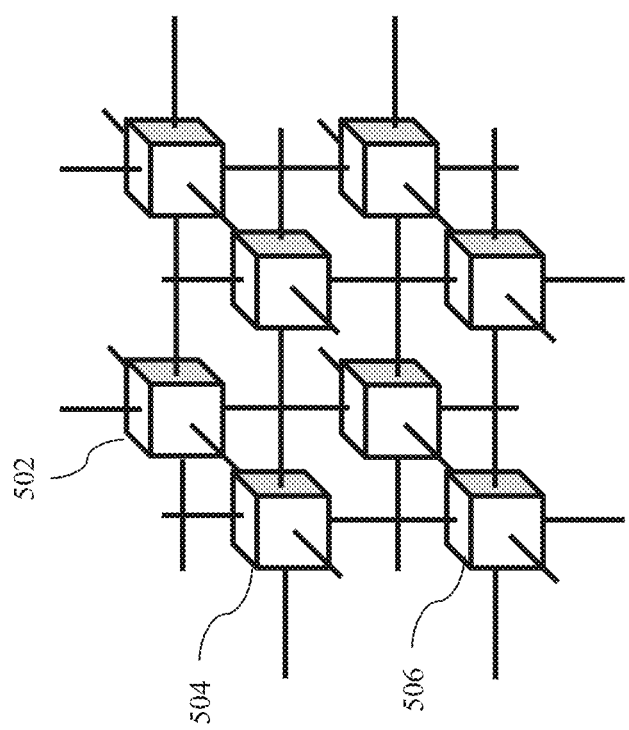
FIG. 5 shows an example interconnection of nodes in a 3D torus network of nodes, in one embodiment.
Figure 7:
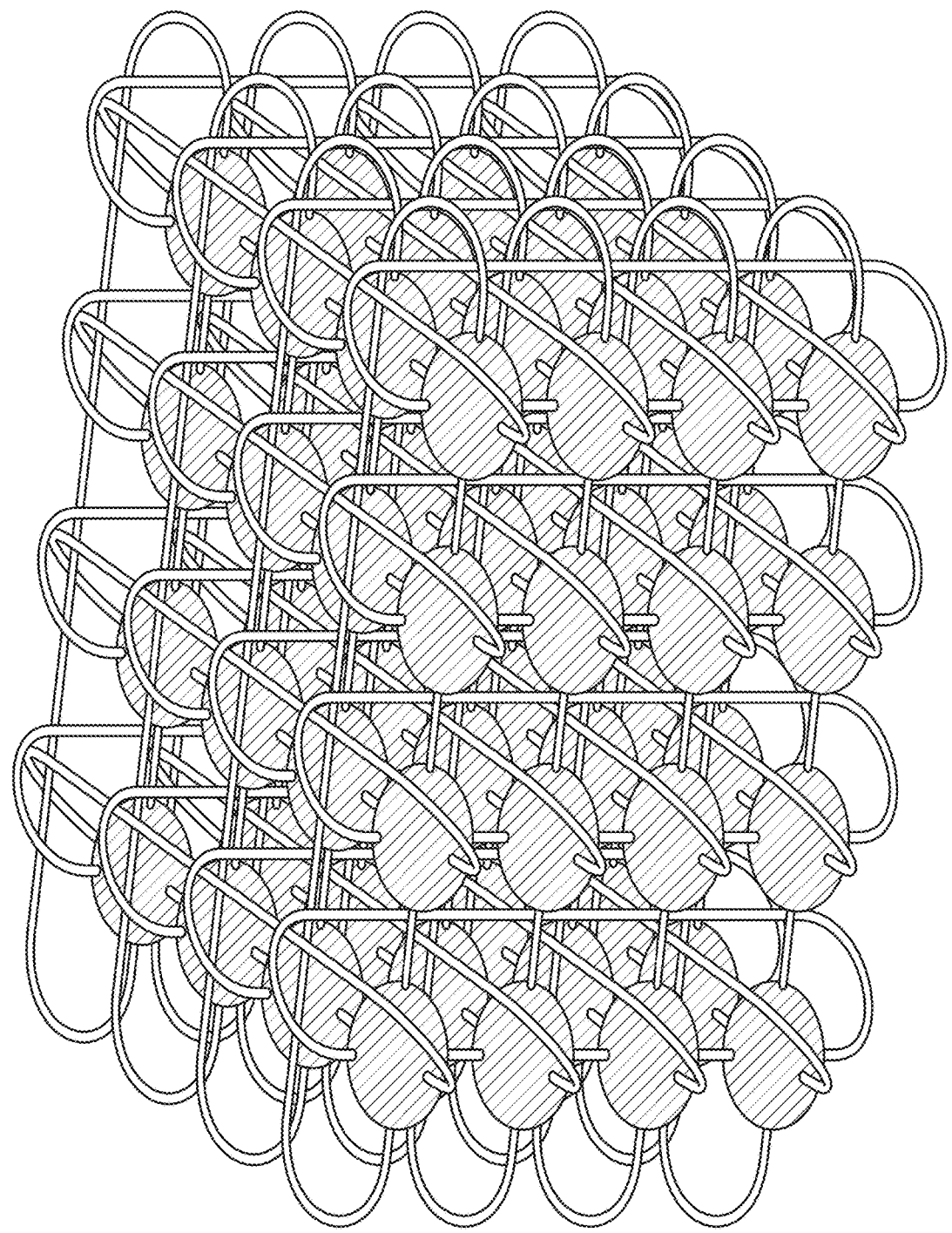
FIG. 7 shows another example of a 3D torus, a 4×4×4 torus in one embodiment.

FIG. 5 shows an example interconnection of nodes in a 3D torus network of nodes. The example shown is a 2×2×2 torus. A node 502 in a 3D torus can be interconnected 6 ways to its neighboring nodes. While wrap links are not shown, an edge node 502 can be connected in a loop around manner to the opposite edge node, e.g., 504. Similarly, the edge node 504 can be connected to an edge node 506 in a loop around manner. For instance, each of the edge nodes can wrap or loop around. FIG. 7 shows another example of a 3D torus, a 4×4×4 torus in one embodiment.

Figure 6:
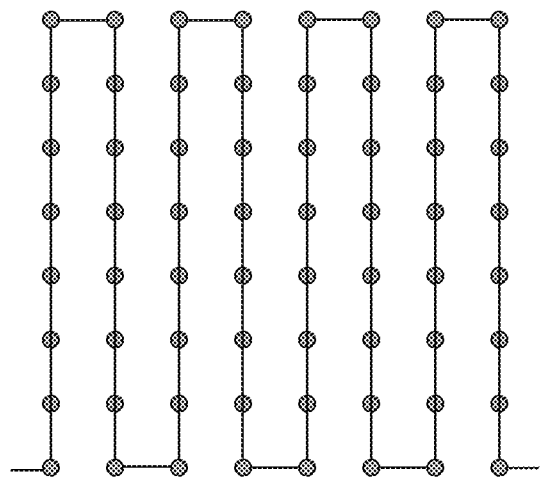
FIG. 6, for example, shows a mapping of a 2D 8×8 torus into a 1D 64 torus in an embodiment.

As an example, to map a 3D 8×8×16 torus down to a 2D torus, the 2 shortest torus dimensions may be folded into a 1-dimensional (1D) torus. In the 8×8×16 example, a 2D 8×8 torus may be mapped into a long 1D torus of 64 grid points, as shown in FIG. 6. For instance, FIG. 6 shows mapping of a 2D 8×8 to a 1D 64 nodes. The same mapping may work even if the second dimension is a mesh (without torus wrap links). A 3D 8×8×16 torus is then mapped into a 2D 64×16 torus while maintaining nearest neighbor torus bandwidth. However, this mapping is asymmetric and applications may prefer a more symmetric mapping, for instance, to balance network traffic along different dimensions, which can lead to improved application performance.

A method, system and technique are presented that maps the dimensions of the 2D application stencil or communication pattern to more than one diagonal of the planes in the 3D torus of hardware. The new mapping scheme also results in a "good" utilization of the torus links. For example, a method and system may map a k-dimensional (k-D) communication pattern to an N-dimensional (N-D) torus when product of all dimensions is the same. Some dimensions in the k-D communication pattern divide the N-D torus. Remaining dimensions are positive integer multiples of torus dimensions. In one embodiment, the net effect is that diagonals are followed in the torus to map to the communication pattern.

Figure 1:
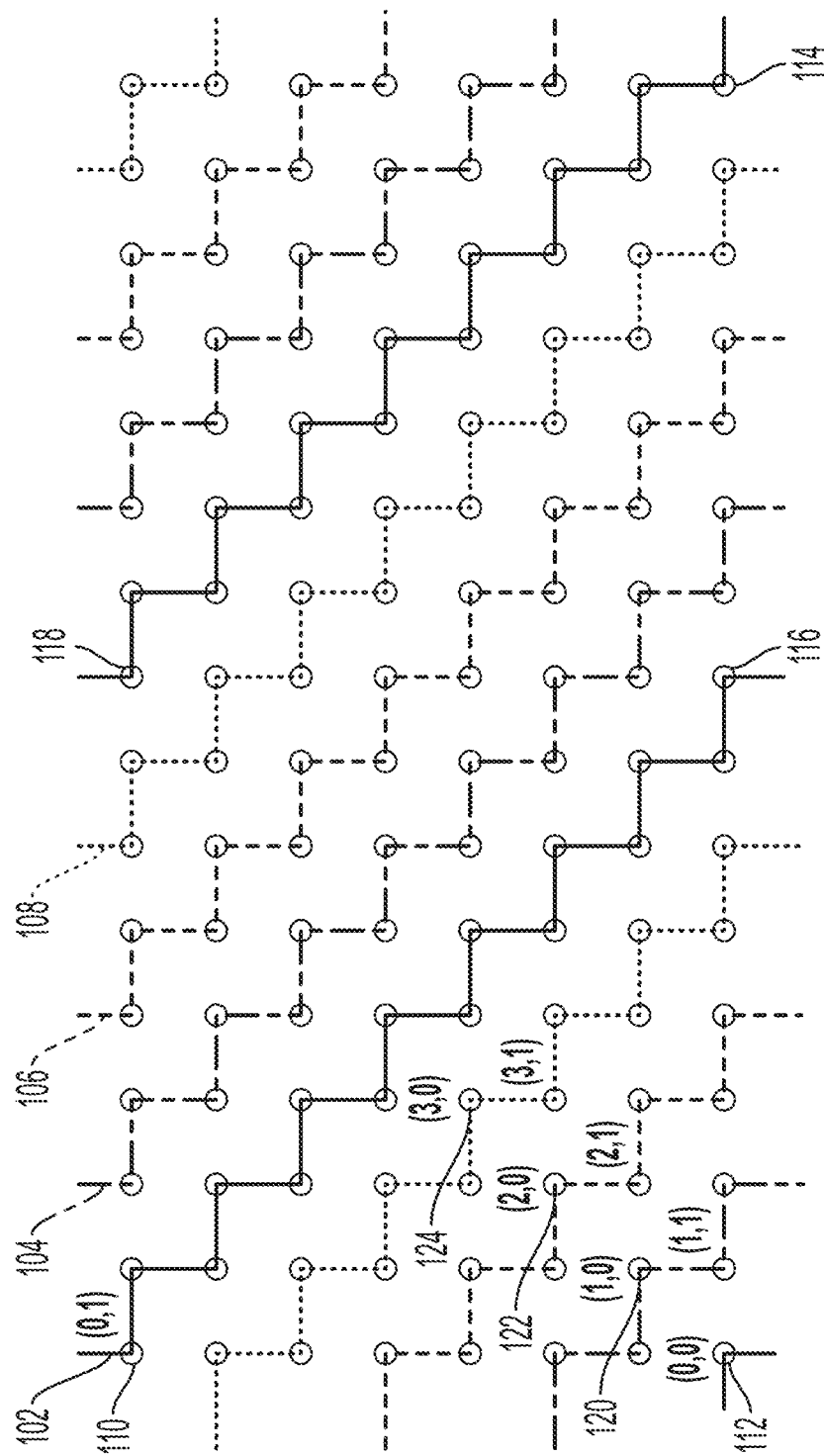
FIG. 1 is a diagram illustrating an example mapping of 2D communication pattern on a torus network topology, in one embodiment.
Figure 3:
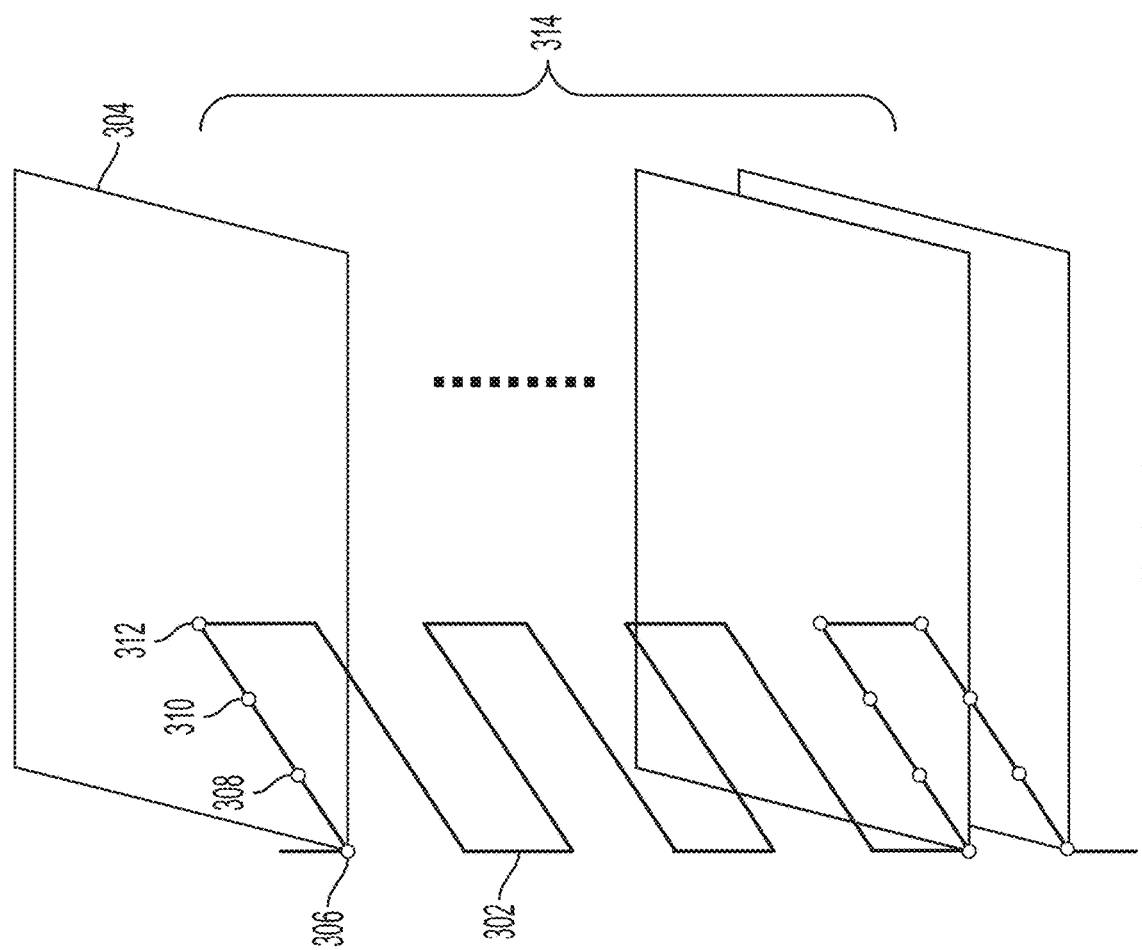
FIG. 3 shows a connection that combines the 4 meshes (×4) with the $3^{rd}$×8 torus dimension to form a 1D torus of length 32, in one embodiment.

FIG. 1 is a diagram illustrating an example mapping of 2D communication pattern on a torus network topology, in one embodiment. The figure shows a view of one plane (2D) of the 3D torus network. While FIG. 1 shows 2D to 2D mapping, this figure combined with FIG. 3 illustrates 3D to 2D mapping in one embodiment. Referring to FIG. 1, each circle represents a node (a grid point) in a parallel computing system, which may contain a router and has a processor interface and communication links (e.g., full-duplex links) to neighboring nodes. A grid point represents a compute node with a network and routing element, and compute nodes are physically interconnected in multi-dimensional tori. In one aspect, applications need mapping of higher dimensional torus to lower dimensional torus, while maintaining nearest neighbor network bandwidth. Generally, a node, e.g., 110 may include one or more semiconductor chips or integrated circuits. A chip may include one or more processors and each processor may include multiple cores, for instance, multiprocessing cores. A core can comprise a logical execution unit containing an L1 cache and functional units. Cores can independently execute programs or threads. A node may contain other hardware components and/or devices such as a memory and a network device. Each node, e.g., 110, occupies a particular point within the torus and is interconnected, directly or indirectly, by a physical wire to every other node within the torus. Multiple connecting paths between nodes are often possible.

A system and method in one embodiment allows for more symmetric mapping from higher dimensional torus down to lower dimensions. For instance, using the same 8×8×16 torus example, the system and/or method may first map 8 (torus)×16 (torus) into 4 (mesh)×32 (torus). FIG. 1 shows, as an example, 8 (torus)×16 (torus) plane mapped into 4 (mesh)×32 (torus) plane. The 4 meshes are shown by different hatch lines in the figure. The 32 torus is contiguous in 2-dimensional (2D) plane. For instance, a mesh connects 32 nodes on the plane shown. Each of the different line hatches 102, 104, 106, 108 represents a 1-dimensional (1D) line. In this example, the 4 different line hatches 102, 104, 106, 108 correspond to a second ×4 mesh dimension. For instance, a method of such mapping may include choosing a starting point (e.g., 0 coordinate, e.g., node labeled as (0,0)) of each line so that an adjacent line (another mesh) can start a node diagonally opposite a chosen line's starting point. In one aspect, routing sharing factor is 2. Some examples of more symmetrical mapping may include, but not limited to: 8×8×16 to 32×32; 8×16×32 to 64×64, 16×16× 32 to 128×64. While the last example (16×16×32 to 128×64) may not be fully symmetrical, the mapping is still more symmetrical, for instance, compared to another mapping such as 16×16×32 to 256×32.

In the figure, for example, at the edges, the top left node 110 of line 102 connects to the bottom left node 112 of line 102. That bottom left node 112 of line 102 also connects to the bottom right node 114 of line 102. The node 116 of line 102 connects to the node 118 of line 102. Lines 104, 106 and 108 are connected similarly at the edges. For example, each of the different line hatches (represent a mesh) wraps (loops) around the edges to connect the edge nodes of the same line hatch. Each line hatch segment between a pair of directly connected nodes represents a physical torus interconnect link.

Figure 2:
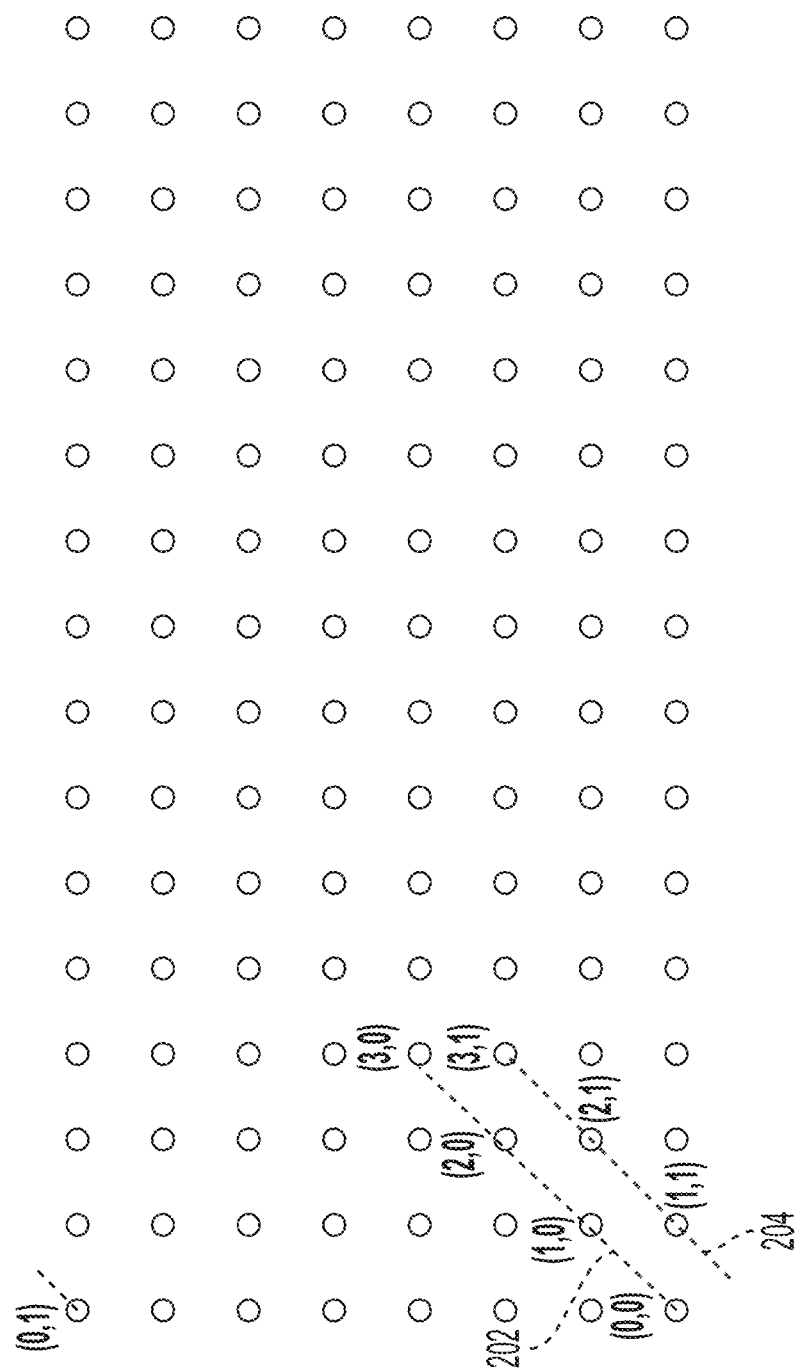
FIG. 2 shows virtual links 202, 204 among neighboring nodes in one embodiment.

In the ×4 mesh dimension, nearest neighbor links are virtual. For example, two neighboring nodes do not have direct diagonal links between them. To send a network packet to each other, each packet will travel 2 hops over the network links along the 1×1 grid. The effective nearest neighbor bandwidth is ½ of the physical link bandwidth. FIG. 2 shows some virtual links 202, 204 among neighboring nodes in one embodiment. In one embodiment, there are 32 such ×4 virtual meshes in the 8×16 example, for simplicity, only two ×4 mesh lines are shown in FIG. 2.

In one aspect, the 4 meshes 102, 104, 106 and 108 may be combined with the remaining ×8 torus (in 8 planes, e.g., the third dimension of the torus network) to make another torus with 32 nodes in the second dimension. FIG. 3 shows a connection that combines the 4 meshes (×4) in one embodiment. The line 302 shown in FIG. 3 is replicated 32 times to form a 32×32 torus mapping (along with connections shown in FIG. 1 in each of the 8 planes).

In general, some embodiments of the system and method in the present disclosure allows mapping of an M×N 2D torus into a (M/2 mesh)×(2*N torus), e.g., given that both M and N are even, N=k*M, and k can be an integer, e.g., greater than 0 (e.g., k=1, 2, . . . ). The above described 8×16 example has M=8, N=16 and k=2. The method increases flexibility of mapping applications onto high dimension torus networks. The notations L, M, N, and k represent positive integers, for example, greater than zero.

Figure 4:
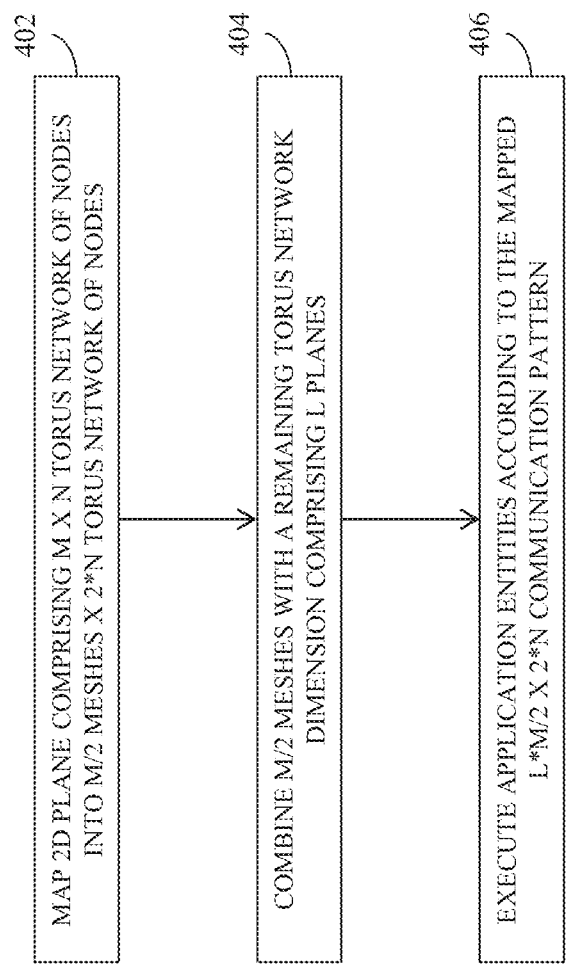
FIG. 4 is a diagram illustrating a method of mapping computer processes to a torus network of nodes in a parallel computing environment, in one embodiment.

FIG. 4 is a diagram illustrating a method of mapping application entities such as processes to a torus network of nodes in a parallel computing environment (e.g., to execute the application processes on the network of nodes), in one embodiment. Application entities, for example, can be application processes, threads, or another entity that can be executed on a computer processor. For instance, a 2-dimensional (2D) communication pattern can be mapped on 3-dimensional (3D) network of computer nodes for execution. Torus dimension sizes can be general. At 402, in a L×M×N 3D torus network of computer nodes, a 2D plane comprising M×N torus network of nodes is mapped into M/2 meshes× 2*N torus network of nodes. In one aspect, N=k*M (k multiplied by M or k times M) and both M and N are even. k is an integer greater than 0 (e.g., k=1, 2, . . . ). Each of M/2 mesh of the 2*N torus is contiguous in the 2D plane, for example, as shown in FIG. 1. The mapping is performed for each of the L planes of the L×M×N 3D torus network. L, M and N represent dimensions of a 3D torus network. The M/2 mesh can be further folded with the L dimension to form a 1D L*M/2 torus (e.g., given that L is even too).

As described above with reference with FIG. 1, mapping of a 2D plane comprising M×N torus network of nodes into M/2 meshes×2*N torus network of nodes may include the following. For each of M/2 meshes, a starting node is selected in the 2D plane and a zigzag diagonal line pattern of nodes is followed in alternating horizontal and vertical direction (e.g., alternating dimension direction such as alternating x and y direction in a 2D x-y plane) on the 2D plane, wherein a zigzag diagonal line pattern of a mesh does not overlap with another zigzag diagonal line pattern of another mesh. The edge nodes of the zigzag diagonal line pattern connect in a loop around manner. In one embodiment, the starting node of a mesh may be selected such that the starting node and another starting node of another mesh are diagonally opposite corner nodes of a 1×1 rectangular configuration (e.g., as shown in FIG. 1 at 112, 120; 120, 122; 122, 124). In one embodiment, in the 8×8×16 example, there are multiple zigzag diagonal lines, 4 in one plane, and there are 8 planes, therefore, a total of 4×8=32 zigzag diagonal lines. The zigzag diagonal lines correspond to one dimension of the mapping. The virtual links in shown in FIG. 2 and FIG. 3 form the second torus dimension after mapping. For simplicity, only one example is shown. In this example, there are 32 such patterns, starting from different points, i.e., (0, y) where y=0, 1, . . . , 31.

At 404, the M/2 meshes are combined with a remaining torus network dimension (e.g., L planes), for instance, as shown in FIG. 3. The combining creates another 2*N pattern, wherein a (L*M/2)×(2*N) communication pattern is created, which may be more symmetric. For instance, a group of M/2 nodes on a 2D plane, each node in the group belonging to a different mesh of the M/2 meshes, and being diagonally adjacent on the 2D plane is selected, for each of the L number of 2D planes, and the nodes are contiguously connected through the L number of 2D planes. For instance, FIG. 3 shows nodes of four meshes (using the above 8×8×16 example) on a plane 304 (e.g., as shown in FIG. 1), each node belonging to a different mesh, contiguously connected through the 8 planes 314. Creating such a connection 302 for each disjoint group of M/2 nodes creates an L*M/2 pattern. Hence a possibly more symmetric L*M/2 (e.g., shown in FIG. 1)×2*N (shown in FIG. 3) communication pattern can be created. In one aspect, different pairs, (L,N), (M,N), (L,M) may be tried before combining with the last dimension, and a more symmetric result may be selected.

At 406, application entities or processes can be executed according to the mapped L*M/2×2*N communication pattern. The application entities or processes can be executed in parallel on the mapped computer nodes of the torus network.

Mapping application's communication pattern or virtual topology onto a physical hardware topology enables improvement in the application's overall execution time. The technique of mapping a 2D communication pattern onto 3D torus hardware configuration or architecture in the present disclosure in one embodiment maps application processing entities on the processing units (e.g., CPUs, cores) of the hardware architecture, and improves or optimizes data exchange or communications between the processing entities (e.g., tasks, processes, threads, and/or the like). In one aspect, generally, a set of 1D meshes may be formed on a 2D plane ($1^{st}$ and $2^{nd}$ dimension) of a 3D torus, and another set of 1D meshes may be formed on a remaining dimension ($3^{rd}$ dimension) of the 3D torus, creating or mapping a 2D mesh on the 3D torus.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of mapping and executing 2-dimensional (2D) communication patterns on 3-dimensional (3D) network of computer nodes, comprising:

in a L×M×N 3D torus network of computer nodes, mapping a 2D plane comprising M×N torus network of nodes into M/2 meshes×2*N torus network of nodes, wherein N=k*M, k is an integer greater than zero, and M and N are even numbers, wherein each of M/2 mesh of the 2N torus is contiguous in the 2D plane, the mapping performed for each of the L planes of the L×M×N 3D torus network;

combining the M/2 meshes with a remaining torus network dimension comprising L planes, the combining creating another 2*N pattern, wherein an L*M/2×2*N communication pattern is created; and executing application entities according to the mapped L*M/2×2*N communication pattern.

2. The method of claim 1, wherein the mapping a 2D plane comprising M×N torus network of nodes into M/2 meshes×2*N torus network of nodes, comprises:

for each of M/2 meshes, selecting a starting node in the 2D plane and following a zigzag diagonal line pattern of nodes in alternating horizontal and vertical direction on the 2D plane, wherein a zigzag diagonal line pattern of a mesh does not overlap with another zigzag diagonal line pattern of another mesh, edge nodes of the zigzag diagonal line pattern connected in a loop around manner.

3. The method of claim 2, wherein the starting node of a mesh is selected such that the starting node and another starting node of another mesh are diagonally opposite corner nodes of a 1×1 rectangular configuration.

4. The method of claim 1, wherein edge nodes of the 3D torus network are connected in a loop around manner.

5. The method of claim 1, wherein the application entities include application entities communicating in stencil pattern.

6. The method of claim 1, wherein the application entities are executed in parallel on the mapped computer nodes.

7. A computer readable storage medium storing a program of instructions executable by a machine to perform a method of mapping and executing 2-dimensional (2D) communication patterns on 3-dimensional (3D) network of computer nodes, comprising:
- in a L×M×N 3D torus network of computer nodes, mapping a 2D plane comprising M×N torus network of nodes into M/2 meshes×2*N torus network of nodes, wherein N=k*M, k is an integer greater than zero, and M and N are even numbers, wherein each of M/2 mesh of the 2*N torus is contiguous in the 2D plane, the mapping performed for each of the L planes of the L×M×N 3D torus network; and
- combining the M/2 meshes with a remaining torus network dimension comprising L planes, the combining creating another L*M/2 pattern, wherein an L*M/2×2*N communication pattern is created; and
- executing application entities according to the mapped L*M/2×2*N communication pattern.

8. The computer readable storage medium of claim 7, wherein the mapping a 2D plane comprising M×N torus network of nodes into M/2 meshes×2*N torus network of nodes, comprises:
- for each of M/2 meshes, selecting a starting node in the 2D plane and following a zigzag diagonal line pattern of nodes in alternating horizontal and vertical direction on the 2D plane, wherein a zigzag diagonal line pattern of a mesh does not overlap with another zigzag diagonal line pattern of another mesh, edge nodes of the zigzag diagonal line pattern connected in a loop around manner.

9. The computer readable storage medium of claim 8, wherein the starting node of a mesh is selected such that the starting node and another starting node of another mesh are diagonally opposite corner nodes of a 1×1 rectangular configuration.

10. The computer readable storage medium of claim 7, wherein edge nodes of the 3D torus network are connected in a loop around manner.

11. The computer readable storage medium of claim 7, wherein the application entities include application entities communicating in stencil pattern.

12. The computer readable storage medium of claim 7, wherein the application entities are executed in parallel on the mapped computer nodes.

13. A system, comprising:
- an L×M×N 3D torus network of computer nodes, wherein a 2D plane comprising M×N nodes of the 3D torus network mapped into M/2 meshes×2*N torus network of nodes, wherein N=k*M, k=1,2, . . . , and both M and N are even numbers, wherein each of M/2 mesh of the 2*N torus is contiguous in the 2D plane, mapping performed for each of the M planes of the L×M×N 3D torus network, and
- the M/2 meshes combined with a remaining torus network dimension comprising M planes, combining creating a L*M/2 pattern, wherein an L*M/2×2*N communication pattern is created and mapped to the L×M×N 3D torus network,
- wherein application entities can be executed according to the mapped L*M/2×2*N communication pattern.

14. The system of claim 13, wherein a mesh of the 2*N torus that is contiguous in the 2D plane is mapped by selecting a starting node in the 2D plane and following a zigzag diagonal line pattern of nodes in alternating horizontal and vertical direction on the 2D plane, wherein a zigzag diagonal line pattern of a mesh does not overlap with another zigzag diagonal line pattern of another mesh, edge nodes of the zigzag diagonal line pattern connected in a loop around manner.

15. The system of claim 14, wherein the starting node of the mesh is selected such that the starting node and another starting node of another mesh are diagonally opposite corner nodes of a 1×1 rectangular configuration.

16. The system of claim 13, wherein edge nodes of the 3D torus network are connected in a loop around manner.

17. The system of claim 13, wherein the application entities include application entities communicating in stencil pattern.

18. The system of claim 13, wherein the application entities are executed in parallel on the mapped computer nodes.

* * * * *